United States Patent
Lee et al.

(10) Patent No.: US 8,523,369 B2
(45) Date of Patent: Sep. 3, 2013

(54) METHOD FOR COMPENSATING LIGHT REFLECTION OF PROJECTION FRAME AND PROJECTION APPARATUS

(75) Inventors: Jian-Wei Lee, Taipei Hsien (TW); Hsin-Yu Chen, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 434 days.

(21) Appl. No.: 12/628,235

(22) Filed: Dec. 1, 2009

(65) Prior Publication Data
US 2011/0051100 A1 Mar. 3, 2011

(30) Foreign Application Priority Data
Aug. 25, 2009 (TW) .............................. 98128568 A

(51) Int. Cl.
*G03B 21/20* (2006.01)
(52) U.S. Cl.
USPC ............................................. 353/85; 353/121
(58) Field of Classification Search
USPC .............................................. 353/31, 85, 121
See application file for complete search history.

(56) References Cited

U.S. PATENT DOCUMENTS

| | | | |
|---|---|---|---|
| 6,183,092 B1 | 2/2001 | Troyer | |
| 6,309,072 B1 * | 10/2001 | Deter | ............................... 353/31 |
| 7,284,867 B2 * | 10/2007 | Hamaya | ............................ 353/69 |
| 2006/0044540 A1 | 3/2006 | Yun | |
| 2007/0236671 A1 * | 10/2007 | Bitetto | ............................ 353/122 |
| 2009/0040336 A1 * | 2/2009 | Irie | .............................. 348/223.1 |

FOREIGN PATENT DOCUMENTS

| | | |
|---|---|---|
| CN | 1507281 | 6/2004 |
| JP | 2005-99478 | 4/2005 |
| JP | 2005099478 | 4/2005 |
| JP | 2008-147889 | 6/2008 |
| JP | 2008147889 | 6/2008 |
| JP | 2009-071783 | 2/2009 |
| JP | 2009071783 | 4/2009 |
| TW | 200413818 | 8/2004 |
| TW | 200613879 | 5/2006 |
| TW | 1310891 | 6/2009 |

OTHER PUBLICATIONS

"Search Report of European counterpart application", issued on Mar. 4, 2010, p. 1-p. 5.
"Office Action of Taiwan Counterpart Application", issued on Mar. 5, 2013, p. 1-p. 11, in which the listed references were cited.

* cited by examiner

*Primary Examiner* — Thanh Luu
(74) *Attorney, Agent, or Firm* — Jianq Chyun IP Office

(57) ABSTRACT

A method for compensating light reflection of a projection frame and a projection apparatus is provided. In the method, a preset frame is projected by the projection apparatus. Next, a spectrum of a light reflected by the projected preset frame is detected and compared with an original spectrum of the preset frame. A light characteristic value of the projected preset frame is then adjusted accordingly, so as to compensate a difference between the detected spectrum of the reflected light and the original spectrum.

13 Claims, 5 Drawing Sheets

METHOD FOR COMPENSATING LIGHT REFLECTION OF PROJECTION FRAME AND PROJECTION APPARATUS

CROSS-REFERENCE TO RELATED APPLICATION

This application claims the priority benefit of Taiwan application serial no. 98128568, filed on Aug. 25, 2009. The entirety of the above-mentioned patent application is hereby incorporated by reference herein and made a part of specification.

BACKGROUND OF THE INVENTION

1. Field of the Invention

The invention is generally related to a method for light compensation and an apparatus using the method. More particularly, the invention is related to a method for compensating light reflection of a projection frame and a projection apparatus.

2. Description of Related Art

Due to advancements in projection technologies, development of projection systems and related equipments has leapt forward significantly in recent years. The principles of a projector are similar to an overhead projector or a slide projector. In these systems, a bulb with high brightness is used as a light source to project an image onto a white screen or wall. Nowadays, commercially available projectors can be categorized into CRT projectors, transmissive polysilicon projectors (commonly referred to as LCD projectors), and Digital Light Processing (DLP) projectors.

The LCD projectors can be produced to be thin while possessing a small footprint. In addition, all images are projected from the same lens and there is no need to joint these images. Therefore, compared to the traditional projectors, the LCD projectors have become a mainstream on the market due to features of convenient to carry and easy to adjust. Moreover, when presenting a report or a training course, the projector can be connected to a computer, so as to directly project the images in the computer onto a screen, thus saving the need to produce slides and making progress towards a paperless office.

However, in light of how projectors are used nowadays, an ideal situation is to project frames on a white and fully reflective screen, while surrounding light sources are turned off or shielded. Practically, the projection frames are affected by various types of light pollution (e.g., from a fluorescent lamp) causing a decrease in contrast as well as shifts in color temperature. If the projected background is not a white screen or wall, reduction in reflectivity also causes the decrease in contrast and the shifts in hues. Therefore, there is a need to develop a projection apparatus capable of adjusting the quality of projected images according to environmental changes, thereby providing users with a desirable viewing quality.

SUMMARY OF THE INVENTION

Accordingly, the invention is directed to a method for compensating light reflection of a projection frame. By projecting a preset frame and comparing the spectrum of a reflected light with the spectrum of the preset frame so as to adaptively perform adjustment, compensation for the light reflection of the projection frame can be realized.

The invention is directed to a projection apparatus, in which a light sensor is disposed at a location where a user views the projection frame, so as to detect a light reflected by the projection frame and accordingly adjust the brightness, contrast, and saturation of the projection frame, and thereby allowing the user to view a projection frame that is substantially close to its original quality.

The invention provides a method for compensating light reflection of a projection frame suitable for a projection apparatus. In the method, a preset frame is projected first, and then a spectrum of a light reflected by the preset frame is detected. Thereafter, the spectrum of the reflected spectrum is compared with an original spectrum of the preset frame, and then a light characteristic value of the projected preset frame is adjusted accordingly, so as to compensate a difference between the reflected spectrum and the original spectrum.

In another perspective, the invention provides a projection apparatus including a projection unit, a light sensor, and a processing unit. Wherein, the projection unit projects a preset frame. The light sensor detects a spectrum of a light reflected by the preset frame projected by the projection unit. The processing unit compares the reflected spectrum with an original spectrum of the preset frame, and accordingly adjusts a light characteristic value of the projected preset frame, so as to compensate a difference between the reflected spectrum and the original spectrum.

In summary, according to aspects of the invention, in the method for compensating light reflection of the projection frame and the projection apparatus using the method, a plurality of preset frames are projected and a light sensor is used to detect the light reflected by the preset frames, and the light characteristic value of the preset frames is adjusting accordingly. Consequently, the same viewing quality can be provided to the user in different environments.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to provide users with a desirable viewing quality, a light sensor is disposed on a projection apparatus or placed at a location near the user for detecting a spectrum of a light that is reflected by the projection frame and exposed to the user's eyes, and accordingly the current levels of light pollution and the rate of light absorption and reflection of the projection background are analyzed. The result of the analysis is then sent to the projection apparatus for making corresponding output adjustments, such that the spectrum of the reflected light detected by the light sensor can be closely matched with the spectrum of the original frame. In order to make the invention more comprehensible, embodiments are described below as the examples to prove that the invention can actually be realized.

Figure 1:
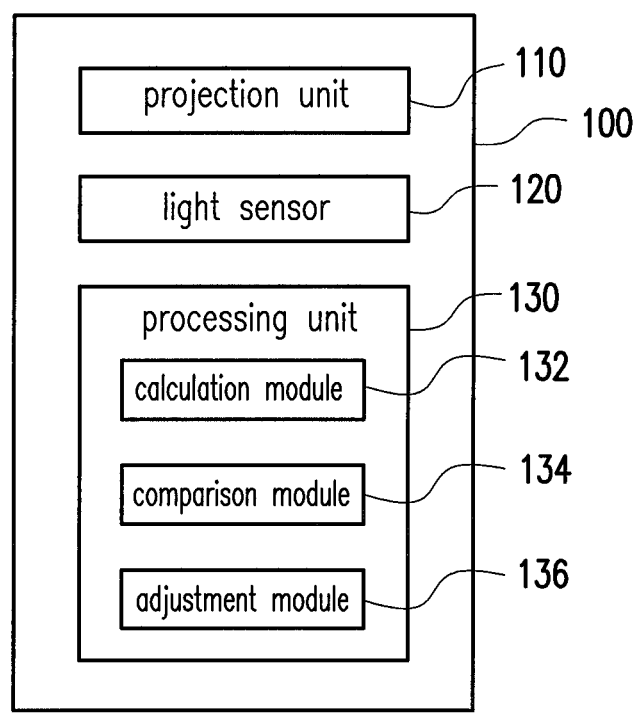
FIG. 1 is a block diagram illustrating a projection apparatus in accordance with one embodiment of the invention.

FIG. 1 is a block diagram illustrating a projection apparatus in accordance with one embodiment of the invention. Referring to FIG. 1, a projection apparatus 100 includes a projection unit 100, a light sensor 120, and a processing unit 130. The projection apparatus 100 is, for example, a CRT projector, a transmissive polysilicon projector (commonly referred to as an LCD projector), or a Digital Light Processing (DLP) projector, and can perform light reflection compensation for the frame projected thereby.

Figure 2:
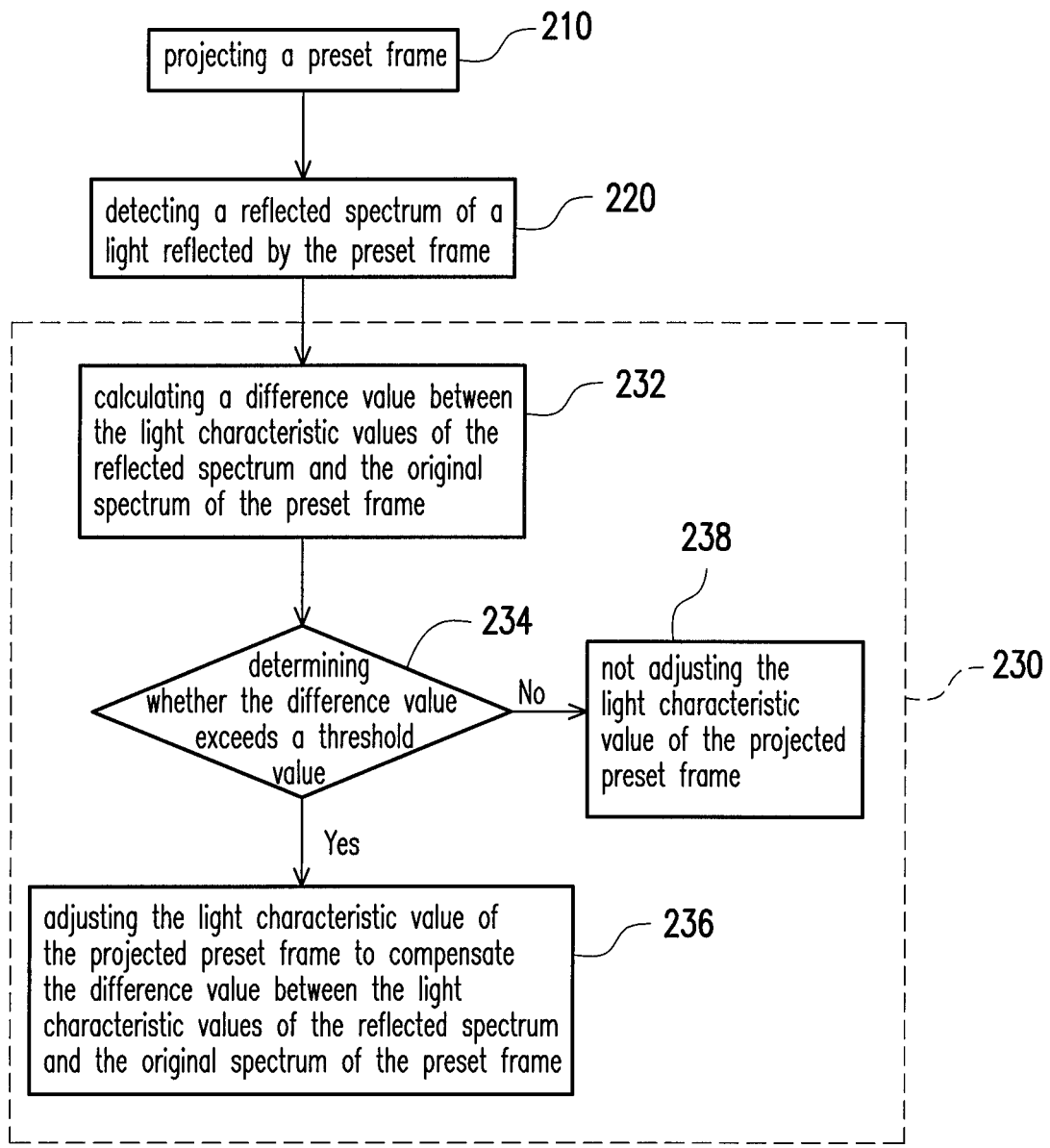
FIG. 2 is a flowchart schematically illustrating a method for compensating light reflection of a projection frame in accordance with one embodiment of the invention.

FIG. 2 is a flowchart schematically illustrating a method for compensating light reflection of a projection frame in accordance with one embodiment of the invention. Referring to FIGS. 1 and 2, a compensating method of the present embodiment is suitable for the projection apparatus of FIG. 1 and used for compensating contrast reduction or color temperature deviation resulted from light pollution or projector background changes. The steps of the method are described in detail hereinafter.

First, the projection unit 110 projects a preset frame (Step S210). Here, the projection unit 110 can execute the steps for compensating the light reflection of a projection frame described below through projecting one or more of a pure white frame, a pure red frame, a pure green frame, or a pure blue frame.

Next, the light sensor 102 detects a spectrum of a light reflected by the preset frame projected by the projection unit 110 (Step S220). For example, the light sensor 120 detects a reflected light surrounding the projection apparatus 100 of the preset frame projected by the projection unit 110, so as to obtain a spectrum thereof. In addition, the light sensor 120 can be disposed on a remote controller close to the user, or disposed on an object placed in a particular location near the user, whereby a spectrum of the reflected light surrounding the projection apparatus 100 of the preset frame projected by the projection unit 110 can be detected. A distance between the aforementioned particular location and the location of the user is smaller than a preset distance (e.g. 1 meter), thereby closely matching the reflected spectrum detected by the light sensor 120 to realistic perceptions of the user's eyes. In other words, the projection unit 110 and the light sensor 120 can be respectively disposed at different locations away from a user, so as to perform projection and light detection at different positions. Additionally, the light sensor 120 can be disposed at a location closer to the user.

It should be noted that after the light sensor 120 detects the spectrum of the reflected light, the present embodiment may use the remote controller, or other transmitting apparatus (not drawn) connected to the light sensor 120, to wirelessly (or with wires) send the reflected spectrum to the projection apparatus 100, so as to perform the subsequent analysis. The aforementioned wireless transmitting method includes radio, Bluetooth, infrared ray, or other suitable methods, and the present embodiment of the invention does not place particular limits thereon.

After the reflected spectrum is obtained, the processing unit 130 compares the detected reflected spectrum with an original spectrum of the preset frame, and a light characteristic value of the projected preset frame is adjusted accordingly, so as to compensate a difference between the reflected spectrum and the original spectrum (Step 230). The original spectrum of the aforementioned preset frame is a spectrum of reflected light of a preset frame detected by the light sensor 120, in which the preset frame is projected by the projection unit 110 under a completely dark environment, for example.

More specifically, the aforementioned processing unit 130 includes a calculation module 132, a comparison module 134, and an adjustment module 136. Moreover, the aforementioned step S230 can be further divided into a plurality of sub-steps described hereinafter. The projection apparatus 100 uses the calculation module 132, for example, to calculate a difference value between a light characteristic value (e.g. light intensity, hue, contrast, saturation) of the reflected spectrum and the original spectrum of the preset frame (Step S232). Thereafter, the comparison module 134 compares the difference value against a threshold value, so as to determine whether the difference value exceeds the threshold value (Step S234). When the difference value exceeds the threshold value, the adjustment module 136 is used to adjust the light characteristic value of the projected preset frame, so as to compensate the difference value of the light characteristic value between the reflected spectrum and the original spectrum of the preset frame (Step 236). Conversely, when the difference value is lower than the threshold value, the adjustment module 136 does not adjust the light characteristic value of the preset frame projected by the projection unit 110 (Step S238).

It should be mentioned that the projection apparatus 100 can compare the reflected spectrum detected by the light sensor 120 with a reflected spectrum of the preset frame projected under an ideal environment (i.e. with no light pollution and a fully reflective screen), so as to analyze the decay of light intensity, the hue shift, and the contrast degradation of each color, for example. Thereafter, depending on the results from such an analysis, a predetermined adjustment plan can be implemented to minimize a loss in image quality. In order to address the aforementioned decay in light intensity, hue, contrast, and saturation, according to some embodiments of the invention, a plurality of adjusting tools are respectively disposed in the projection apparatus 100 to implement corresponding adjustment plans, whereby the light reflection of the projection frame is compensated. The above-described adjusting tools include a brightness adjusting tool, a hue adjusting tool, a contrast adjusting tool, and a saturation adjusting tool. Embodiments of the invention are respectively described below for detailed explanation.

For brightness adjustment, an embodiment of the invention uses the brightness adjusting tool to adjust a light source power of the projection unit 110. By adjusting the brightness of the preset frame projected by the projection unit 110, the aforementioned difference between the brightness of the reflected spectrum and the original spectrum is compensated. The above-described light source is a bulb or other lap sources, for example. Moreover, the aforementioned adjustment to the light source power includes simultaneous adjustments to light intensities of different color light sources, whereby the reflected spectrum detected by the light sensor 120 may be close to the original spectrum.

For hue adjustment, an embodiment of the invention uses the hue adjusting tool to adjust a gain of each of a plurality of color components projected by the projection apparatus 100, whereby the hue of the projected frame is balanced. The above-described color components include red, blue, green components, but not limited thereto.

Figure 3:
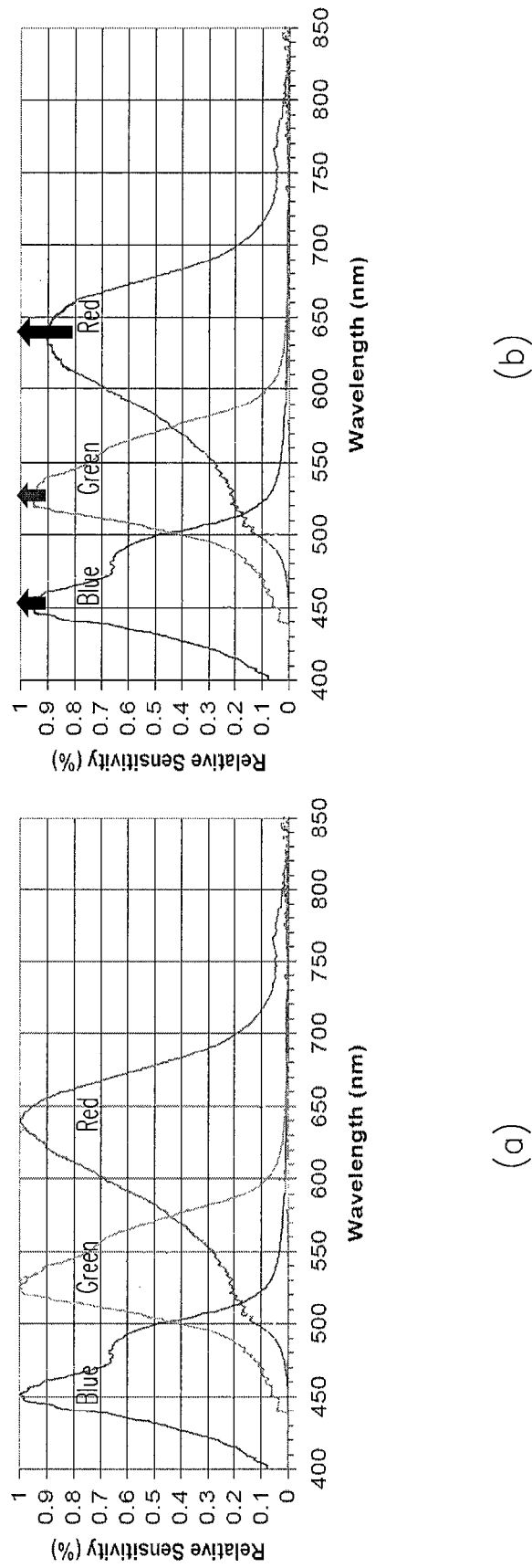
FIG. 3(a) and FIG. 3(b) are waveforms illustrating the method for compensating light reflection of the projection frame in accordance with one embodiment of the invention.

For example, FIG. 3(a) and FIG. 3(b) are waveforms illustrating the method for compensating light reflection of the projection frame in accordance with one embodiment of the invention. The present embodiment of the invention uses a partially reflective, light blue wall as a projection reflector. FIG. 3(a) illustrates the original spectrum of the preset frame projected by the projection unit 110, while FIG. 3(b) illustrates the reflected spectrum detected by the light sensor 120 when the projection unit 110 projects the preset frame on the surface of aforementioned projection reflector. Comparing the spectrum of FIG. 3(b) to the original spectrum of FIG. 3(a), the brightness of the reflected light clearly decreases, while the color temperature of the entire frame shifts toward the blue tone. In order to address the above-described deficiency, the present embodiment of the invention increases the output power of the projection unit 110 lamp to increase the brightness of the entire image (as depicted by the arrows in FIG. 3(b)). In addition, the gain ratio of red gun is slightly increased at the same time, so that the red, green, and blue primary colors of the reflected light are in a substantially balanced state.

Figure 4:
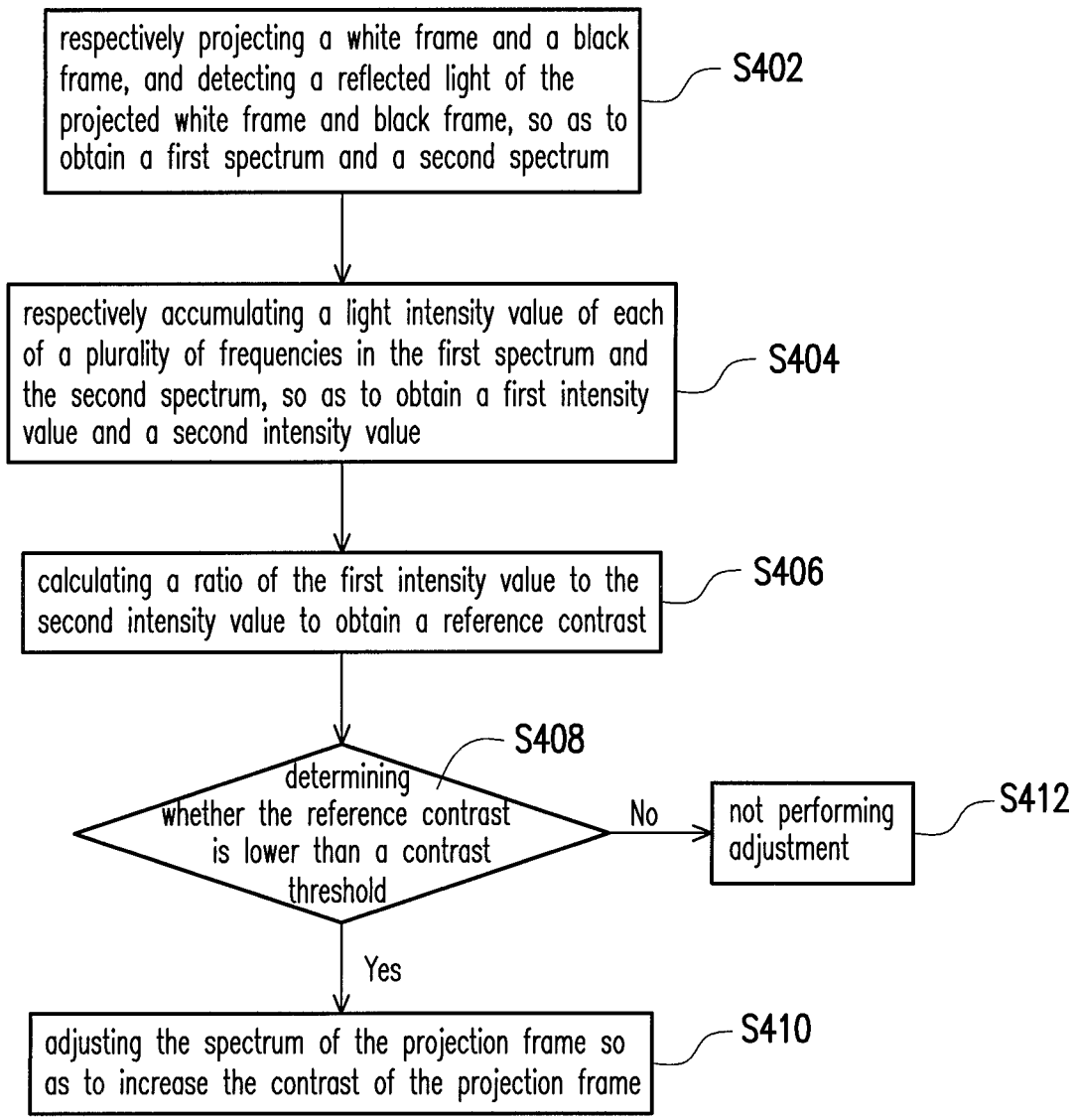
FIG. 4 is a flowchart schematically illustrating a method for adjusting a contrast of a projection frame in accordance with one embodiment of the invention.

For adjusting the contrast, an embodiment of the invention uses the contrast adjusting tool to adjust the contrast of the preset frame projected by the projection unit 110, so as to compensate a contrast difference between the aforementioned reflected spectrum and the original spectrum. For example, FIG. 4 is a flowchart schematically illustrating a method for adjusting a contrast of a projection frame in accordance with one embodiment of the invention. Referring to FIG. 4, by using the contrast adjusting tool, the present embodiment controls the projection unit 110 to respectively project a white frame and a black frame, as well as controlling the light sensor 120 to detect a reflected light of the white frame and the black frame, so as to obtain a first spectrum and a second spectrum (Step S402).

Thereafter, the contrast adjusting tool controls the calculation module 132 to respectively accumulate the light intensity value of each frequency in the first spectrum and the second spectrum, so as to obtain a first intensity value and a second intensity value (Step S404). Afterwards, a ratio of the first intensity value to the second intensity value is calculated to obtain a reference contrast (Step S406). Thereafter, the comparison module 134 is controlled to compare the reference contrast with a contrast threshold, and accordingly determine whether the reference contrast is lower than the contrast threshold (Step S408), so as to determine whether to adjust the contrast.

When the reference contrast is lower than the contrast threshold, the contrast adjusting tool controls the projection unit 110 to adjust the spectrum of the projected frame, so as to increase the contrast of the projected frame (Step S410). Conversely, no adjustment is performed (Step S412). By implementing the above-described method, the projection apparatus 100 can maintain the contrast of the projected frame above a certain ratio, whereby the contrast is controlled.

Figure 5:
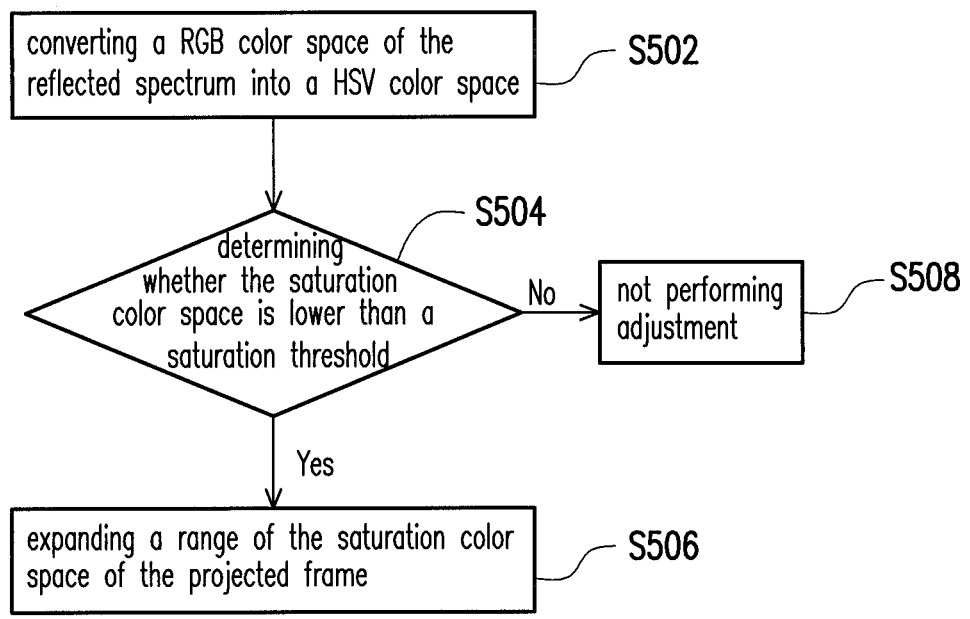
FIG. 5 is a flowchart schematically illustrating a method for adjusting a saturation of the projection frame in accordance with one embodiment of the invention.

For saturation adjustment, an embodiment of the invention uses the saturation adjusting tool to adjust the saturation of the preset frame projected by the projection unit 110, so as to compensate the saturation of the detected reflected light. For example, FIG. 5 is a flowchart schematically illustrating a method for adjusting a saturation of the projection frame in accordance with one embodiment of the invention. Referring to FIG. 5, the present embodiment of the invention uses the saturation adjusting tool to control the calculation module 132, so as to convert the RGB (Red, Green, Blue) color space of the reflected spectrum detected by the light sensor 120 into the HSV (Hue, Saturation, Value) color space (Step S502). Thereafter, the comparison module 134 is controlled to compare the saturation color space with a saturation threshold, so as to determine whether the saturation color space is lower than the saturation threshold (Step S504).

When the saturation color space is determined to be lower than the saturation threshold, the saturation adjusting tool expands a range of the saturation color space of the frame projected by the projection unit 110, so as to increase the saturation of the projection frame (Step S506). Conversely, no adjustment is performed (Step S508).

More specifically, the aforementioned HSV color space can be represented by a three-dimensional cone, in which the circular bottom surface of the cone represents the hue, the saturation increases from the circular center towards the edges, and the brightness decreases from the bottom to the cone tip. Therefore, through expanding the range of the saturation color space, the saturation of the frame can increase.

By using the aforementioned adjustment plans, the projection apparatus 100 can adjust the brightness, hue, contrast, and saturation of the projected frame from the projection unit 110 according to changes in the surroundings. Consequently, the reflected spectrum received by the light sensor 120 (or the user's eyes) can be close to the quality of the original frame.

In light of the foregoing description, the method for compensating light reflection of the projection frame and the projection apparatus using the same of the invention compare the reflected spectrum of the projection frame with the original spectrum of the projection frame, so as to analyze the decay of the light intensity, the hue shift, and the contrast degradation for each color, and accordingly adjusts the light characteristic value of the projection frame, whereby the loss in image quality can be substantially minimized. Moreover, the invention embeds the light sensor in the remote controller or disposes the light sensor in the surroundings of the user, thereby allowing the user to enjoy a desirable viewing quality.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:
1. A method for compensating light reflection of a projection frame, suitable for a projection apparatus, the method comprising:
  projecting a preset frame;
  detecting a reflected spectrum of a light reflected by the preset frame; and
  comparing the reflected spectrum with an original spectrum of the preset frame and adjusting a light characteristic value of the projected preset frame accordingly, so as to compensate a difference between the reflected spectrum and the original spectrum,
  wherein the step of adjusting a light characteristic value of the projected preset frame accordingly, so as to compensate a difference between the reflected spectrum and the original spectrum comprises the step of:
    adjusting a contrast of the projected preset frame, so as to compensate a contrast difference between the reflected spectrum and the original spectrum, comprising:
      respectively projecting a white frame and a black frame, and detecting a reflected light of the projected white frame and black frame, so as to obtain a first spectrum and a second spectrum;
      respectively accumulating a light intensity value of each of a plurality of frequencies in the first spec- trum and the second spectrum, so as to obtain a first intensity value and a second intensity value;

calculating a ratio of the first intensity value to the second intensity value to obtain a reference contrast, and comparing the reference contrast with a contrast threshold; and adjusting the spectrum of the projection frame when the reference contrast is lower than the contrast threshold, so as to increase the contrast of the projection frame.

2. The method as claimed in claim 1, wherein the step of comparing the reflected spectrum and the original spectrum of the preset frame, and adjusting the light characteristic value of the projected preset frame accordingly, so as to compensate the difference between the reflected spectrum and the original spectrum comprises:

calculating a difference value between the light characteristic values of the reflected spectrum and the original spectrum of the preset frame;

determining whether the difference value exceeds a threshold value; and adjusting the light characteristic value of the projected preset frame when the difference value exceeds the threshold value, so as to compensate the difference value between the light characteristic values of the reflected spectrum and the original spectrum of the preset frame.

3. The method as claimed in claim 1, wherein the step of adjusting the light characteristic value of the projected preset frame, so as to compensate the difference between the reflected spectrum and the original spectrum comprises:

adjusting a light source power of the projection apparatus to change a brightness of the projected preset frame, so as to compensate a brightness difference between the reflected spectrum and the original spectrum.

4. The method as claimed in claim 1, wherein the step of adjusting the light characteristic value of the projected preset frame, so as to compensate the difference between the reflected spectrum and the original spectrum comprises:

adjusting a gain of each of a plurality of color components of the preset frame projected by the projection apparatus, so as to balance a hue of the projected preset frame.

5. The method as claimed in claim 1, wherein the step of adjusting the light characteristic value of the projected preset frame, so as to compensate the difference between the reflected spectrum and the original spectrum comprises:

adjusting a saturation of the projected preset frame, so as to compensate a saturation difference between the reflected spectrum and the original spectrum.

6. The method as claimed in claim 5, wherein the step of adjusting the saturation of the projected preset frame, so as to compensate the difference between the reflected spectrum and the original spectrum comprises:

converting a Red, Green, Blue (RGB) color space of the reflected spectrum into a Hue, Saturation, Value (HSV) color space;

determining whether the saturation color space is lower than a saturation threshold; and expanding a range of the saturation color space of the projected frame when the saturation color space is determined lower than the saturation threshold, so as to increase the saturation of the projected frame.

7. The method as claimed in claim 1, wherein the original spectrum of the preset frame is the spectrum of a light reflected by the projected preset frame and detected when the preset frame is projected under a completely dark environment.

8. A projection apparatus, comprising:

a projection unit for projecting a preset frame;

a light sensor, for detecting a reflected spectrum of a light reflected by the preset frame;

a transmitting apparatus, connected to the light sensor, for sending the reflected spectrum to the projection apparatus wirelessly or with wires; and a processing unit for comparing the reflected spectrum transmitted by the transmitting apparatus with an original spectrum of the preset frame and accordingly adjusting a light characteristic value of the projected preset frame, so as to compensate a difference between the reflected spectrum and the original spectrum, wherein the processing unit comprising:

a calculation module for calculating a difference value between the reflected spectrum and the original spectrum of the preset frame;

a comparison module for comparing the difference value with a threshold value; and an adjustment module for adjusting the light characteristic value of the preset frame projected by the projection unit when the comparison module determines the difference value exceeds the threshold value, so as to compensate the difference value between the light characteristic values of the reflected spectrum and the original spectrum of the preset frame, wherein the adjustment module comprising:

a contrast adjusting tool for adjusting a contrast of the projected preset frame, so as to compensate a contrast difference between the reflected spectrum and the original spectrum, wherein the contrast adjusting tool comprising:

controlling the projection unit to respectively project a white frame and a black frame;

controlling the light sensor to detect a reflected light of the projected white frame and the black frame, so as to obtain a first spectrum and a second spectrum;

controlling the calculation module to respectively accumulate a light intensity value of a plurality of frequencies in the first spectrum and the second spectrum, so as to obtain a first intensity value and a second intensity value;

controlling the calculation module to calculate a ratio of the first intensity value to the second intensity value, so as to obtain a reference contrast;

controlling the comparison module to compare the reference contrast with a contrast threshold; and adjusting the spectrum of the projected frame when the comparison module determines the reference contrast is lower than the contrast threshold, so as to increase the contrast of the projected frame.

9. The projection apparatus as claimed in claim 8, wherein the adjustment module comprises:

a brightness adjusting tool for adjusting a light source power of the projection unit to change a brightness of the projected preset frame, so as to compensate a brightness difference between the reflected spectrum and the original spectrum.

10. The projection apparatus as claimed in claim 8, wherein the adjustment module comprises:

a hue adjusting tool for adjusting a gain of each of a plurality of color components of the preset frame projected by the projection unit, so as to balance a hue of the projected preset frame.

11. The projection apparatus as claimed in claim 8, wherein the adjustment module comprises:
   a saturation adjusting tool for adjusting a saturation of the preset frame projected by the projection unit, so as to compensate a saturation difference between the reflected spectrum and the original spectrum.

12. The projection apparatus as claimed in claim 11, wherein the saturation adjusting tool comprises:
   controlling the calculation module to convert a Red, Green, Blue (RGB) color space of the reflected spectrum detected by the light sensor to a Hue, Saturation, Value (HSV) color space;
   controlling the comparison module to compare the saturation color space with a saturation threshold; and expanding a range of the saturation color space of the frame projected by the projection unit, when the comparison module determines the saturation color space is lower than the saturation threshold, so as to increase the saturation of the frame projected by the projection unit.

13. The projection apparatus as claimed in claim 8, wherein the light sensor further comprises detecting the spectrum of a light reflected by the projected preset frame when the preset frame is projected by the projection unit under a completely dark environment, so as to obtain the original spectrum of the preset frame.

\* \* \* \* \*